April 30, 1968

J. B. GROENEWEGEN

PRE-ACCELERATED PINCH ROLLER FOR MAGNETIC TAPE TRANSPORT

Filed Sept. 23, 1966

3,380,638

INVENTOR.
JOHANNES B. GROENEWEGEN

BY Christie, Parker & Hale
ATTORNEYS

United States Patent Office 3,380,638

Patented Apr. 30, 1968

3,380,638

PRE-ACCELERATED PINCH ROLLER FOR MAGNETIC TAPE TRANSPORT

Johannes B. Groenewegen, Glendora, Calif., assignor to Consolidated Electrodynamics Corporation, Pasadena, Calif., a corporation of California Filed Sept. 23, 1966, Ser. No. 581,548
3 Claims. (Cl. 226—181)

This invention relates to magnetic tape recorders and, more particularly, to digital tape recorders which employ pinch rollers for starting and stopping movement of the magnetic tape.

The use of a pinch roller to clamp magnetic tape against a rotating capstan in digital tape recorders is well known. Rates of engagement and disengagement of the pinch roller with the capstan may exceed several hundred engagements per second. Each engagement requires the acceleration of the tape to a predetermined speed within an extremely short interval, of the order of 1½ to 2 milliseconds in duration. It has been found that the rate of acceleration of the magnetic tape is materially affected by the angular velocity of the pinch roller at the time it engages the magnetic tape. For instance, if a digital tape recorder is operating at low rates of tape engagement and disengagement, then the pinch roller will slow down or even stop during periods of disengagement. The slower the angular speed of the pinch roller at the time of engagement, the more energy is required to bring the pinch roller back up to its operating speed, which in turn increases the time to bring the magnetic tape up to the desired operating speed.

It has heretofore been proposed, for example, to provide continuous frictional engagement between the pinch roller and the capstan by means of an O-ring on the pinch roller. The O-ring rides against the capstan and through frictional engagement with the surface of the capstan transmits rotation to the pinch roller. The O-ring projects beyond the surface of the pinch roller so that the frictional engagement with the capstan exists even though a small space between the capstan and the pinch roller surfaces is maintained to permit disengagement of the tape drive.

When the pinch roller is moved into engagement with the magnetic tape and capstan, the O-ring, of course, is squeezed at the point of contact sufficiently to permit the capstan and pinch roller to come together. Such a system has several disadvantages which are overcome by the present invention. First the rubber O-ring wears substantially to the point where the frictional drive begins to slip. Second, any inaccuracies in the diameter of the O-ring produce a noticeable flutter in the tape drive. It has further been found that unless the yoke supporting the pinch roller and the capstan support are very rigid, the O-ring on one edge of the pinch roller can produce a skewing of the tape.

The present invention avoids the above disadvantages by providing means for maintaining the pinch roller velocity at the desired speed without any direct mechanical coupling to the pinch roller to impart rotation thereto. This is accomplished by providing a small impeller on the end of the pinch roller against which an air jet impinges. The air jet is derived from the associated air bearing which guides the magnetic tape over the capstan.

For a more complete understanding of the invention, reference should be made to the accompanying drawings, wherein.

Figure 1:
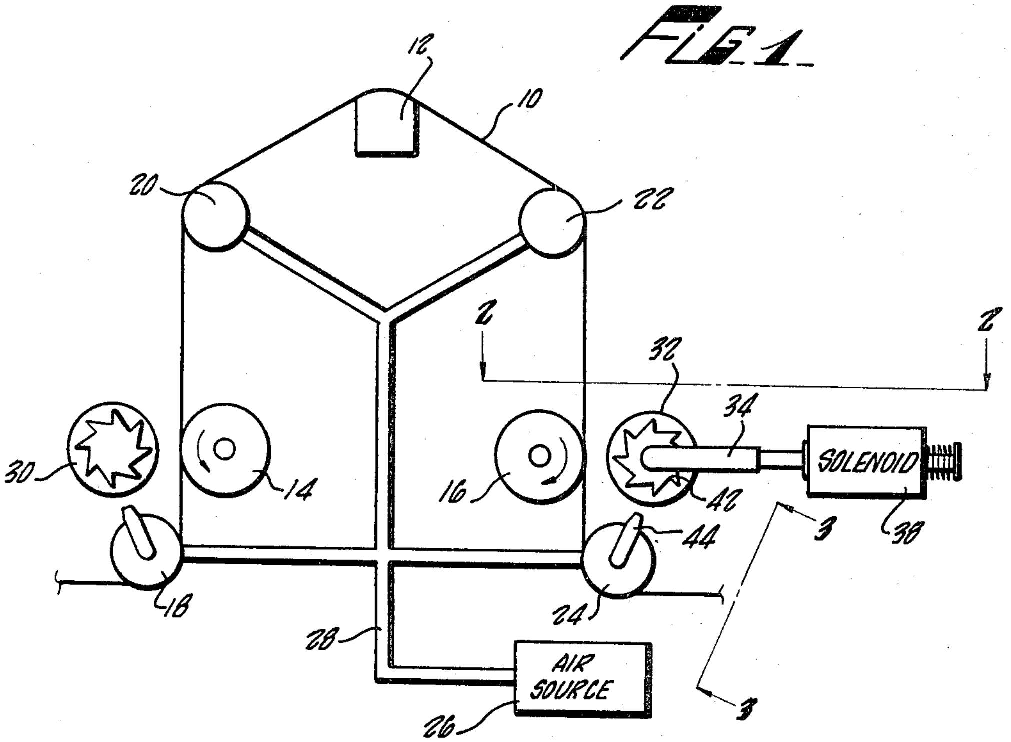
FIGURE 1 is a schematic showing of a magnetic tape transport incorporating the features of the present invention.

Referring to the drawings in detail, the numeral 10 indicates generally the magentic tape which is transported past a transducer head 12 in either direction by a pair of oppositely rotating capstans 14 and 16. The magnetic tape 10 is guided by air bearing type guides, indicated at 18, 20, 22 and 24, each of which is supplied by air under pressure from a suitable air source, indicated generally at 26, through tubing 28.

The magnetic tape 10 is frictionally engaged with the capstans 14 and 16 respectively by pinch rollers 30 and 32. Since the pinch rollers are identical in operation, only the construction of the pinch roller 32 will be described in detail.

The pinch roller 32 is rotatably supported by a yoke 34, which in turn is mounted on one end of a plunger 36 operated by a solenoid 38. When the solenoid 38 is energized, it compresses a spring 40 and moves the plunger in a direction to force the pinch roller 32 into engagement with the magnetic tape 10 and the capstan 16. When the solenoid 38 is de-energized, the spring 40 withdraws the pinch roller from engagement with the magnetic tape.

Figures 2, 3:
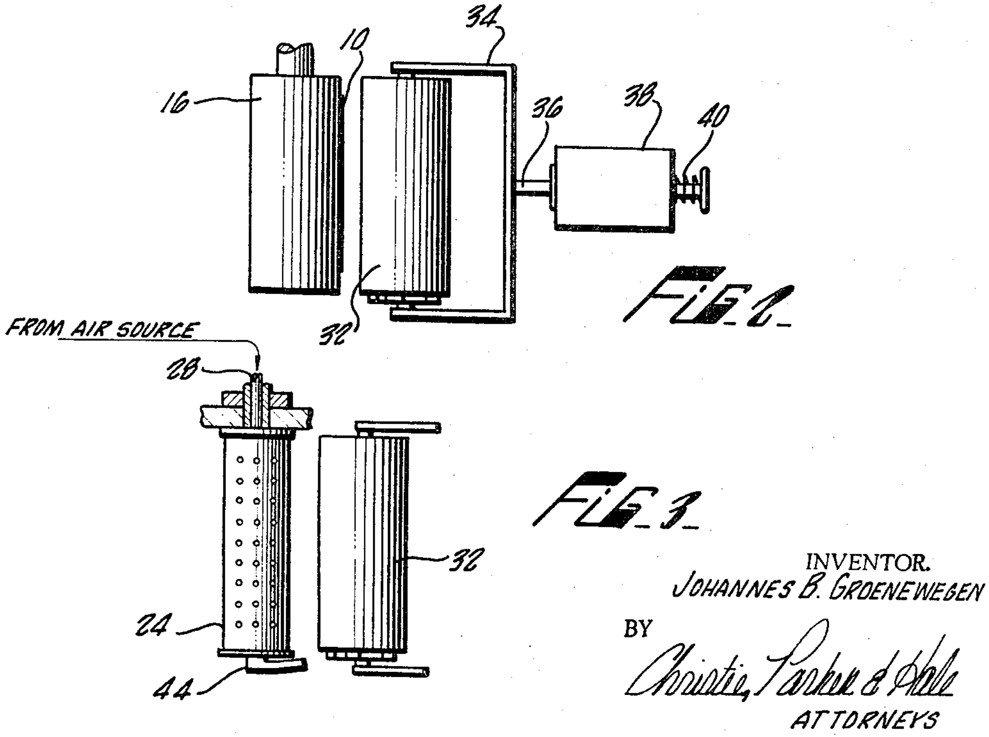
FIGURE 2 is a partial view taken along the line 2—2 of FIGURE 1.
FIGURE 3 is a partial view taken along the line 3—3 of FIGURE 1.

According to the present invention, the pinch roller 32 is continuously rotated so as to have substantially the same peripheral velocity as the associated capstan. Therefore substantially no energy is required to accelerate the pinch roller when the pinch roller becomes engaged with the capstan. To this end, the pinch roller is provided at one end with a small impeller 42 which may be in the form of a notched disk or other means for providing an irregular surface on one end of the pinch roller against which impinges a jet of air from a small jet nozzle 44. The jet nozzle 44 is preferably in the form of a short length of tubing which connects with the air bearing 24. As best shown in FIGURE 3, the air bearing is in the form of a cylindrical member having a plurality of holes communicating with the interior, air under pressure being introduced to the interior of the air bearing through the tubing 28. Air bleeding out through the openings in the air bearing provides a cushion of air on which the surface of the tape rides in passing over the guide. Thus the air bearing provides a ready source of air under pressure, a portion of which is directed through the jet 44 and caused to impinge on the irregular surface formed by the impeller 42. The speed of rotation of the pinch roller can readily be adjusted by slightly bending the jet 44 so as to vary the angle at which the air impinges against the irregular surface formed by the impeller 42.

The above arrangement has the advantage that there are no wearing parts for transferring rotation to the pinch roller nor is there any mechanical linkage which would interfere with the lateral displacement of the pinch roller in engaging the capstan.

What is claimed is:

1. A magnetic tape drive comprising a rotating capstan, a pinch roller, means rotatably supporting the roller, means for moving the roller into and out of rolling engagement with the capstan, means for guiding tape between the capstan and the pinch roller, a source of air under pressure, a small jet nozzle connected to said source, and impeller means on one end of the pinch roller, said jet nozzle being positioned to direct a jet of air against the impeller means for imparting rotation to the pinch roller.

2. Apparatus as defined in claim 1 wherein said source of air includes an air bearing tape guide positioned adjacent the capstan for guiding the tape, the jet nozzle being connected to and supported by the tape guide.

3. Apparatus as defined in claim 1 wherein the impeller means comprises a notched disk secured to one end of the pinch roller.

References Cited

UNITED STATES PATENTS

| | | | |
|---|---|---|---|
| 2,788,209 | 4/1957 | Montijo | 242—55.12 |
| 3,039,665 | 6/1962 | Swanson | 226—187 |
| 3,217,877 | 11/1965 | Howyo | 209—111.7 |

EDWARD A. SROKA, *Primary Examiner.*

H. C. HORNSBY, *Assistant Examiner.*